No. 769,571. Patented September 6, 1904.

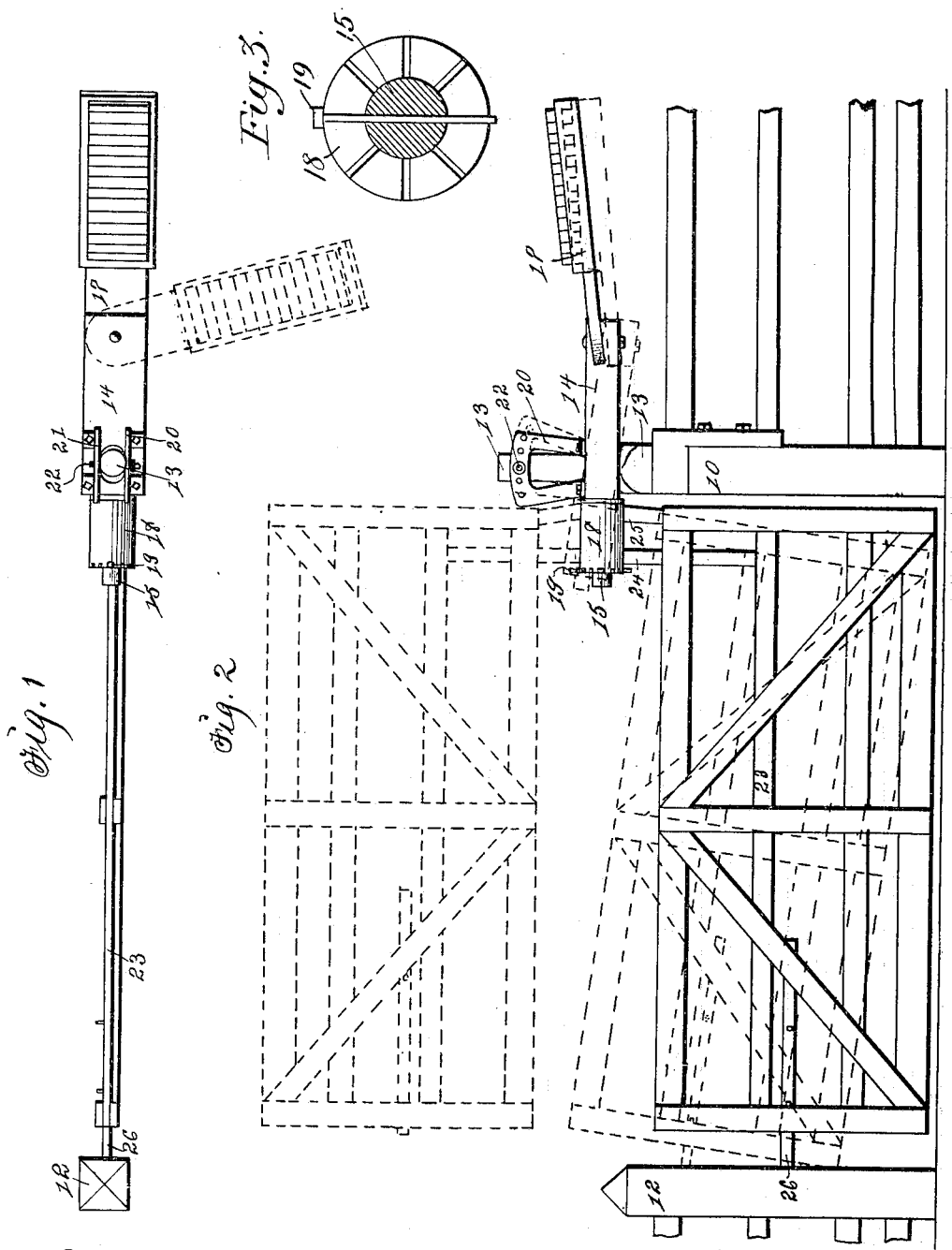

UNITED STATES PATENT OFFICE.

GEORGE W. SNYDER, OF PUEBLO, COLORADO.

ADJUSTABLE SWINGING GATE.

SPECIFICATION forming part of Letters Patent No. 769,571, dated September 6, 1904.

Application filed April 12, 1904. Serial No. 202,822. (No model.)

*To all whom it may concern:*

Be it known that I, GEORGE W. SNYDER, a citizen of the United States, residing at Pueblo, in the county of Pueblo and State of Colorado, have invented a new and useful Adjustable Swinging Gate, of which the following is a specification.

My object is to provide a farm-gate that can be readily elevated into an inverted position and retained above the gate-post, so that horses and wagons can pass under it, also that can be adjusted relative to the gate-posts, so as to securely close the passage-way between the fixed gate-posts, and that can be adjusted and retained in position to swing over snow or other obstructions and to allow hogs and other small animals to pass under it and at the same time prevent horses and cattle from passing through the gateway.

My invention consists in the construction, arrangement, and combination of operative mechanism with a fixed post and a gate, as hereinafter set forth, pointed out in my claims, and illustrated in the accompanying drawings, in which—

Figure 1 is a top view of the gate, and dotted lines indicate the movement of a weight pivotally connected with the gate and the fixed post. Fig. 2 is a side view of the gate, and dotted lines indicate the position of the gate when inverted and retained in an elevated position its entire length, and dotted lines also indicate the position of the gate when its free end only is elevated. Fig. 3 is an end view of a roller to which the gate is attached and shows how it is combined with a gate-carrier and the manner in which the roller may be locked to retain the gate in an inverted position, as shown in Fig. 2.

The numerals 10 and 12 designate fixed gate-posts. An upright bearer 13 for supporting a gate-carrier is formed on or fixed to the top of the post 10, as shown, or in any suitable way, and a gate-carrier 14 mounted thereon to swing horizontally and to vibrate vertically. It has an integral shaft 15 at its front end and a pivoted weight-support 17 at its rear end. On the shaft 15 is a roller 18, that is provided with notches in its front, so that a pin 19 can be passed through a pin-hole in the shaft, and coinciding notches in the end of the roller as required for locking the roller to the shaft.

Frames 20 and 21 are fixed in parallel position on top of the gate-carrier 14 and provided with a plurality of coinciding pin-holes, so they can be adjustably connected with the bearer 13 by means of a pin or bolt 22, passed through an aperture in the bearer 13, as shown in Fig. 1. By this means the gate-carrier can be placed and retained in an inclined position, as shown by dotted lines in Fig. 2 and as required to retain the free end of the gate elevated.

A gate 23, that may vary in size, material, and manner of construction, is rigidly fixed to and suspended from the roller 18 by means of bars 24 and 25, fixed to the rear end and top portion of the gate and the under side of the roller, as shown in Fig. 2, or in any suitable way in such a manner that the gate can be elevated into an inverted position, as indicated by dotted lines in Fig. 2, by turning the roller half a revolution and then locking it by passing the pin 19 through the pin-hole in the shaft 16 and coinciding notches in the end of the roller 18. A latch 26 is slidably attached to the front end of the gate for fastening the gate to the post 12 as required to keep the gate closed. The pivoted weight-carrier 17 acts as a counterpoise to the gate to facilitate the adjusting and moving of the gate and retaining it perpendicular.

The advantages of means for elevating and adjusting the vertical inclination of the gate and also for inverting it and locking it in an inverted and elevated position are obvious.

Having thus set forth the purpose of my invention and the construction and functions of the different parts, the practical utility and operation thereof will be readily understood by farmers and others familiar with the art to which it pertains, and

What I claim as new, and desire to secure by Letters Patent, is—

1. In a farm-gate, a bearer at the top of a gate-post, a gate-carrier pivotally connected with the bearer, a shaft extending forward from the front end of the gate-carrier, a roller on said shaft having notches in its outer end as shown and means for locking the roller to the carrier, arranged and combined to operate in the manner set forth for the purposes stated.

2. In a farm-gate, a bearer at the top of a gate-post, a gate-carrier pivotally connected with the bearer, means to adjust the vertical inclination of said carrier, a shaft extending forward from the front end of the gate-carrier, a roller on said shaft and means for locking the roller to the carrier and a weight-carrier pivoted to the rear end of the gate-carrier to swing horizontally, arranged and combined to operate in the manner set forth for the purposes stated.

3. In a farm-gate, a bearer at the top of a gate-post, a gate-carrier pivotally connected with the bearer, a shaft extending forward from the front end of the gate-carrier, a roller on said shaft having notches in its outer end as shown and means for locking the roller to the carrier, a weight-carrier pivoted to the rear end of the gate-carrier to swing horizontally and a gate fixed at its rear end to said roller, arranged and combined to operate in the manner set forth for the purposes stated.

4. In a farm-gate, a bearer at the top of a gate-post, a gate-carrier pivotally connected with the bearer, a shaft extending forward from the front end of the gate-carrier, a roller on said shaft and means for locking the roller to the carrier, a weight-carrier pivoted to the rear end of the gate-carrier to swing horizontally and a gate fixed at its rear end to said roller and means for adjustably connecting the gate-carrier with the top of the carrier support or bearer, arranged and combined to operate in the manner set forth for the purposes stated.

5. An adjustable farm-gate comprising a fixed gate-post having a bearer at its top provided with a transverse pin-hole, a gate-carrier pivotally connected with the bearer, frames fixed to the gate-carrier to project upward in parallel position and provided with coinciding perforations, a pin extended through said perforations and the pin-hole in the bearer, a weight-carrier pivoted to the rear end of the gate-carrier to swing horizontally, a shaft extending forward from the front end of the gate-carrier, a pin-hole in the shaft extending vertically, a roller on said shaft provided with notches in its front end and a gate fixed to the roller, arranged and combined to operate in the manner set forth for the purposes stated.

GEORGE W. SNYDER.

Witnesses:
PERRY M. KEEN,
GEO. W. SNYDER.